United States Patent
Liu et al.

(10) Patent No.: US 10,288,323 B2
(45) Date of Patent: May 14, 2019

(54) SOLAR RECEIVER WITH METAMATERIALS-ENHANCED SOLAR LIGHT ABSORBING STRUCTURE

(71) Applicant: Palo Alto Research Center Incorporated, Palo Alto, CA (US)

(72) Inventors: Victor Liu, Mountain View, CA (US); Bernard D. Casse, Saratoga, CA (US); Armin R. Volkel, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 549 days.

(21) Appl. No.: 14/969,139

(22) Filed: Dec. 15, 2015

(65) Prior Publication Data

US 2017/0167755 A1 Jun. 15, 2017

(51) Int. Cl.
*F24S 70/10* (2018.01)
*F24J 2/48* (2006.01)
(Continued)

(52) U.S. Cl.
CPC .............. *F24S 70/10* (2018.05); *F24J 2/0488* (2013.01); *F24J 2/07* (2013.01); *F24J 2/484* (2013.01);
(Continued)

(58) Field of Classification Search
CPC .............. F24S 20/20; F24S 70/10; F24S 70/60
(Continued)

(56) References Cited

U.S. PATENT DOCUMENTS

| 1,111,239 A | 9/1914 | Smelser |
| 2,712,772 A | 7/1955 | Trombe |
| (Continued) | | |

FOREIGN PATENT DOCUMENTS

| CN | 101227158 A | 7/2008 |
| DE | 3205439 A1 | 8/1983 |
| (Continued) | | |

OTHER PUBLICATIONS

Currie et al. "High-Efficiency Organic Solar Concentrators for Photovoltaics", Science 321 (2008), pp. 226-228.
(Continued)

*Primary Examiner* — Avinash A Savani
*Assistant Examiner* — Aaron H Heyamoto
(74) *Attorney, Agent, or Firm* — Bever, Hoffman & Harms, LLP

(57) ABSTRACT

A metamaterials-enhanced solar receiver for a Concentrating Solar Power (CSP) plant includes spectrally-selective metamaterials-enhanced surface features engineered into the sunlight-receiving (upward-facing) surface of a high melting point sunlight absorbing material. The spectrally-selective features include substantially cube-shaped microcavities surrounded by associated interlaced walls disposed in a periodic (waffle-like) array having a grating period in the range of 0.5 to 2 microns, thereby forming a metamaterial structure exhibiting high absorptance efficiency (i.e., above 95%) of incident solar radiation having wavelengths in the visible light spectrum through induced coupling of visible light to the interlaced walls by way of generating surface plasmonic waves that resonate at visible light frequencies, whereby thermal energy is efficiently absorbed into the solar receiver to heat a transfer fluid. The metamaterial structure is also configured to minimize emissions in the infrared (IR) spectrum, thus minimizing thermal losses.

20 Claims, 6 Drawing Sheets

(51) Int. Cl.
*H02S 40/20* (2014.01)
*F24J 2/04* (2006.01)
*F24J 2/07* (2006.01)

(52) U.S. Cl.
CPC ............... *H02S 40/20* (2014.12); *F24J 2/485* (2013.01); *Y02E 10/41* (2013.01); *Y02E 10/44* (2013.01); *Y02E 10/46* (2013.01)

(58) Field of Classification Search
USPC .................................................. 126/661
See application file for complete search history.

(56) References Cited

U.S. PATENT DOCUMENTS

| | | | |
|---|---|---|---|
| 3,861,379 | A | 1/1975 | Anderson, Jr. |
| 3,892,433 | A | 7/1975 | Blake |
| 3,905,352 | A | 9/1975 | Jahn |
| 3,923,381 | A | 12/1975 | Winston |
| 3,924,604 | A | 12/1975 | Anderson |
| 4,068,653 | A | 1/1978 | Bourdon et al. |
| 4,109,638 | A | 8/1978 | Matlock et al. |
| 4,110,009 | A | 8/1978 | Bunch |
| 4,110,010 | A | 8/1978 | Hilton |
| 4,110,123 | A | 8/1978 | Goetzberger et al. |
| 4,114,596 | A | 9/1978 | Chang et al. |
| 4,117,682 | A | 10/1978 | Smith |
| 4,130,109 | A | 12/1978 | Brueck |
| 4,148,301 | A | 4/1979 | Cluff |
| 4,149,902 | A | 4/1979 | Mauer et al. |
| 4,153,813 | A | 5/1979 | Blieden et al. |
| 4,190,465 | A | 2/1980 | Boling |
| 4,193,819 | A | 3/1980 | Wohlmut |
| 4,218,114 | A | 8/1980 | Bunch |
| 4,234,352 | A | 11/1980 | Swanson |
| 4,261,335 | A | 4/1981 | Balhorn |
| 4,266,530 | A | 5/1981 | Steadman |
| 4,440,153 | A | 4/1984 | Melchior |
| 4,771,764 | A | 9/1988 | Cluff |
| 4,935,631 | A | 6/1990 | Mosley et al. |
| 5,180,441 | A | 1/1993 | Cornwall et al. |
| 5,274,497 | A | 12/1993 | Casey |
| 5,816,238 | A | 10/1998 | Burns et al. |
| 6,239,353 | B1 | 5/2001 | Hall et al. |
| 6,820,611 | B2 | 11/2004 | Kinoshita |
| 6,953,038 | B1 | 10/2005 | Nohrig |
| 7,192,146 | B2 | 3/2007 | Gross et al. |
| 7,677,241 | B2 | 3/2010 | Hickerson |
| 7,706,030 | B2 | 4/2010 | Herloski et al. |
| 8,354,628 | B2 | 1/2013 | Schmaelzle et al. |
| 2003/0016539 | A1 | 1/2003 | Minano et al. |
| 2003/0051750 | A1 | 3/2003 | Lawheed |
| 2007/0137690 | A1 | 6/2007 | Bruning et al. |
| 2007/0137691 | A1 | 6/2007 | Cobb et al. |
| 2008/0308154 | A1 | 12/2008 | Cart et al. |
| 2009/0038608 | A1 | 2/2009 | Caldwell |
| 2009/0126778 | A1 | 5/2009 | Brounne et al. |
| 2009/0205701 | A1 | 8/2009 | Govaerts et al. |
| 2009/0235974 | A1 | 9/2009 | Mapel et al. |
| 2010/0051016 | A1 | 3/2010 | Ammar |
| 2010/0110430 | A1 | 5/2010 | Ebbesen |
| 2011/0000543 | A1 | 1/2011 | Errico |
| 2011/0079267 | A1 | 4/2011 | Raymond et al. |
| 2011/0284059 | A1 | 11/2011 | Celanovic |
| 2012/0031467 | A1 | 2/2012 | Schmaelzle et al. |
| 2012/0161600 | A1 | 6/2012 | Norris |
| 2012/0192917 | A1 | 8/2012 | Whitted et al. |
| 2012/0325313 | A1 | 12/2012 | Cheung et al. |
| 2012/0325314 | A1 | 12/2012 | Cheung et al. |
| 2013/0047609 | A1 | 2/2013 | Schmaelzle et al. |
| 2013/0047977 | A1 | 2/2013 | Schmaelzle et al. |
| 2013/0276777 | A1* | 10/2013 | Reis ............... F24S 10/70 126/661 |
| 2015/0132596 | A1 | 5/2015 | Yamada et al. |
| 2015/0228827 | A1 | 8/2015 | Casse |
| 2015/0288318 | A1 | 10/2015 | Guler et al. |

FOREIGN PATENT DOCUMENTS

| | | |
|---|---|---|
| DE | 3633172 A1 | 4/1988 |
| EP | 0575797 A1 | 12/1993 |
| JP | 2003332607 A | 11/2003 |
| WO | 2007109901 A1 | 10/2007 |
| WO | 2010033859 A1 | 3/2010 |
| WO | 2011012545 A1 | 2/2011 |
| WO | 2011148307 A1 | 12/2011 |

OTHER PUBLICATIONS

Dersch et al. "Trough integration into power plants—a study on the performance and economy of integrated solar combined cycle systems", Energy, vol. 29, Issues 5-6, Apr.-May 2004, pp. 947-959.
Goetzberger et al. "Photovoltaic materials, history, status and outlook", Materials Science and Engineering R 40 (2003), pp. 1-46.
Jones et al. "Rotating Field Collector Subsystem Study and Evaluation", Sandia Contractor Report, 1982, 144 pages.
Kolb et al. "Heliostat Cost Reduction Study", Sandia National Laboratory, Sandia Report SAND2007-3293, Jun. 2007, 159 pages.
Meyer: "Photon Transport in Fluorescent Solar Collectors", Thesis for the degree of Doctor of Philosophy, School of Engineering Sciences, University of Southampton, Jul. 2009, 197 pages.
Murphy, Jr. "Home photovoltaic systems for physicists", Physics Today, Jul. 2008, pp. 42-47.
Schramek et al. "Heliostats for maximum ground coverage", Energy 29 (2004), pp. 701-713.
Smestad et al. "The thermodynamic limits of light concentrators", Solar Energy Materials 21 (1990), pp. 99-111.
Weber et al. "Luminescent greenhouse collector for solar radiation", Applied Optics, vol. 15, No. 10, Oct. 1976, pp. 2299-2300.
Design of tungsten complex gratings for thermophotovoltaic radiators, ScienceDirect, Optics Communications 269 (2007), pp. 411-417, accepted Aug. 16, 2006.
Large Area Micro-optics for Solar Energy, Feb. 20, 2013, 1 page.

* cited by examiner

SOLAR RECEIVER WITH METAMATERIALS-ENHANCED SOLAR LIGHT ABSORBING STRUCTURE

FIELD OF THE INVENTION

This invention relates to solar thermal power plants, and more particularly to sunlight energy (solar) receivers utilized in solar thermal power plant.

BACKGROUND OF THE INVENTION

Concentrating Solar Power (CSP) is a renewable energy technology that utilizes solar thermal power generation to convert solar thermal energy to electricity. The solar thermal power generation process generally involves converting the solar energy into thermal energy, then converting the thermal energy into mechanical energy, and then converting the mechanical energy into electricity. CSP power plants achieve high-efficiency solar thermal power generation by way of utilizing a solar concentrator (e.g., a parabolic trough, a solar dish, or an array of mirrors) to direct concentrated sunlight onto a solar receiver (i.e., a structure comprising a sunlight absorbing material), thereby converting the solar energy into thermal energy by way of heating the solar receiver to a high operating temperature. The thermal energy is then converted into mechanical energy by way of generating high temperature steam (e.g., by forming the light absorbing material of the solar receiver into a pipe-like structure, and passing water/steam through the pipe's conduit). The high temperature steam is then directed to a turbine, whereby the mechanical energy is converted to electricity by a conventional generator driven by the turbine. Excess thermal energy is often collected in molten salts and stored in large insulated tanks, allowing operation of the steam turbine during the night or on cloudy days. CSP power plants are therefore similar to most conventional power plants that utilize heat from a fuel source to drive a stream turbine, but instead of generating heat, e.g., from the combustion of fossil fuels or another non-renewable fuel source, solar thermal power plants produce steam using sunlight.

The evolution of CSP technology is mainly driven by the goal of achieving higher solar receiver operating temperatures, with central receiver CSP plants currently recognized as being superior in this regard over parabolic trough and solar dish CSP plants. Solar receiver operating temperatures above about 500° C., and more preferably above 600° C., are optimal for achieving high power cycle efficiency, reduce material costs for thermal storage, and lower the overall cost of electricity generated by a CSP plant. Parabolic trough CSP plants utilize elongated half-cylinder-shaped parabolic reflectors to concentrate sunlight onto line-type (pipe-like) solar receivers positioned along a focal line defined by each parabolic reflector. Because the parabolic shape focuses sunlight in only one plane, the concentration ratio of parabolic reflectors is limited to 30 to 100 times its normal intensity, whereby parabolic trough CSP plants achieve relatively low maximum operating temperatures (i.e., approximately 400 to 550° C.). Solar dish CSP plants utilize a dish (bowl) shaped reflector that concentrates incident sunlight on a point-type solar receiver located at a focal point of the dish, thereby achieving higher concentration ratios than can be achieved using a parabolic trough reflector, whereby solar dish CSP plants achieving relatively high maximum operating temperatures (i.e., 600-750° C.). However, the solar dish reflector must be constantly repositioned throughout the day to maintain focus of the concentrated sunlight on the solar receiver, so practical considerations associated with supporting and moving solar dishes limit their practical size and corresponding weight, thereby limiting the peak power generation capacity of solar dish CSP plants. Central receiver CSP plants utilize an array of heliostats disposed on the ground next to a tower supporting a solar receiver, where each heliostat includes a mirror and an associated positioning mechanism that repositions the mirror throughout the day to reflect incident sunlight onto the solar receiver. Similar to solar dish CSP plants, the peak power generation capacity of central receiver CSP plants is determined by the amount of sunlight reflected onto the tower-based receiver, which in both cases corresponds to the total reflective area of the mirrors. However, unlike solar dish reflectors whose practical size and weight are limiting factors, the total reflective area of a central receiver CSP system is expandable by installing additional heliostats next to the receiver tower; that is, because each heliostat is disposed on the ground and includes its own mirror positioning mechanism, expanding the reflective area of a central receiver CSP plant merely requires installing an aligning additional heliostats. Existing central receiver CSP plants collect concentrated sunlight reflected from hundreds or thousands of heliostats to achieve concentration ratios as high as 1,500 times the sun's normal intensity, and maximum operating temperatures well above 750° C. Central receiver CSP plants are therefore capable of achieving substantially higher solar receiver operating temperatures than parabolic trough and solar dish CSP plants, and hence are currently the preferred CSP plant technology for large volume electricity generation.

Although advances in CSP technology facilitate the generation of optimal solar receiver operating temperatures (i.e., above about 600° C.), a current limiting factor to further advances in CSP technology is the inability of presently available sunlight absorbing materials to absorb solar energy with high efficiency at these temperatures. As mentioned above, a solar receiver is a structure consisting of a sunlight absorbing material that is configured to transfer absorbed heat to a heat transfer fluid (e.g., molten salt or water/steam). A solar receiver's efficiency is defined by the amount of received solar energy that is absorbed/transferred to the heat transfer fluid versus the amount of received solar energy that is lost due to convective heat losses (e.g., due to wind and buoyancy effects) and radiative heat losses (i.e., as materials get hot, heat energy is radiated away at infrared wavelengths to the surrounding environment). At a 600° C. operating temperature, the primary cause of heat loss from CSP plant's solar receiver is thermal radiation losses, and the rate of radiative heat loss increases as operating temperatures increase above 600° C. Therefore, although central receiver CSP plants are capable of achieving operating temperatures well above 600° C., radiative heat loss from solar receivers at higher operating temperatures limits the overall efficiency of a central receiver CSP plant operating at higher temperatures.

Current efforts to reduce radiative heat loss from solar receivers operating above 600° C. are focused on developing spectrally-selective coatings that are painted or otherwise applied to the solar receiver's "core" sunlight absorbing material. These coatings are formulated to maximize solar absorptance in the visible and near-infrared wavelengths (i.e., approximately 400 to 2500 nm) while minimizing thermal emittance in the infrared wavelengths (i.e., approximately 1 to 20 microns). Because these spectra overlap, especially at higher temperatures, development of selective coatings is challenging. Additionally, these selective absorber coatings need to be durable at high temperatures in exposed environments to avoid degradation. Currently, Pyromark® Series 2500 Flat Black (LA-CO Industries Inc., Elk Grove Village, Ill., USA), which is a high temperature resistant silicone coating exhibiting high solar absorptance (>95%), has been recognized by Sandia National Laboratories as a standard for use on solar receivers in central receiver CSP plants (see Levelized Cost of Coating (LCOC) for Selective Absorber Materials, Clifford K. Ho and James E. Pacheco, SANDIA REPORT SAND2013-8327, Printed September 2013). However, Pyromark® Series 2500 also exhibits a thermal emittance of 0.87 and suffers from large thermal losses during high temperature operation, and also exhibited significant degradation at higher temperatures (>700° C.) when operated in air, causing a decline in performance and potentially added operating costs for CSP plants. Further, the coating-based approach suffers from inherent delamination issues due to the unavoidable differences between the coating material and the underlying sunlight absorbing "core" material forming the solar receiver, and the coating material re-emits in the IR, which lowers thermal efficiency.

What is needed is a solar receiver that exhibits high absorptance (i.e., >95%) and low thermal emittance (i.e., <10%) of solar energy at operating temperatures above 600° C., and also avoids the problems associated with conventional coatings-based approaches.

SUMMARY OF THE INVENTION

The present invention is directed to a solar receiver including a metamaterials-enhanced sunlight receiving surface structure (metamaterial structure) consisting essentially of a high melting point sunlight absorbing material having an upward-facing (sunlight receiving) surface that is photolithographically processed or otherwise fabricated (engineered) to define substantially cube-shaped microcavities surrounded by associated parallel interlaced walls that are arranged in a periodic waffle-like array having a grating period in the range of 0.5 to 2 microns. By processing the sunlight receiving surface to produce the waffle-like array with a grating period in the range of 0.5 to 2 microns, the microcavities and interlaced walls have feature sizes that enhance the generation of surface plasmons primarily resonating at visible light frequencies, whereby the metamaterial structure achieves high absorptance efficiency (i.e., >95%) of sunlight in the visible light spectrum and low thermal emittance (i.e., <10%) in the infrared (IR) spectrum. By forming the metamaterial structure on a solar energy absorbing material having suitable high melting point and low coefficient of thermal expansion at high temperatures (i.e., above 600° C.), the metamaterial structure reliably maintains the surface features of the waffle-like array at the high solar receiver operating temperatures achieved in a CSP plant. Moreover, because the metamaterial structure consists entirely of the waffle-like array fabricated directly into the upward-facing surface of the high melting point solar energy absorbing material (i.e., no coating is applied to the upward-facing surface), the present invention avoids the delamination issue associated with prior art coatings-based solar receiver approaches, thereby providing solar receivers that are optimized for use in CSP plants.

According to alternative specific embodiments of the invention, the high melting point sunlight absorbing material utilized to produce the metamaterials-enhanced surface structure consists essentially of one or more refractory metals (e.g., tantalum or molybdenum) or silicon carbide (SiC). These high melting point solar energy absorbing materials are presently preferred in that they exhibit excellent thermal properties (e.g., low coefficient of thermal expansion and high thermal conductivity) and supports surface plasmon generation at temperatures above 600° C., whereby the metamaterial structure of the present invention facilitates the fabrication of solar receivers for CSP plants that avoid the degradation problems associated with conventional coatings-based approaches. Moreover, because the present invention is not composition-dependent (i.e., the optical characteristics are not limited to a particular composition or particle size), the metamaterials-enhanced solution of the present invention is applicable to yet undiscovered melting point solar energy absorbing materials capable of maintaining optimal optical characteristics at even higher temperatures, whereby the present invention is theoretically applicable to any achievable CSP plant operating temperature.

According to other specific embodiments of the invention, the feature dimensions of the waffle-like array are optimized to enhance the spectrally-selective optical characteristics of the metamaterial structure. In one embodiment, each of the interlaced walls has a thickness in the range of 0.2 to 1.0 microns, and each microcavity of the plurality of microcavities has a width in the range of 0.1 to 1 micron and a depth in the range of 0.1 to 3 microns, which facilitates the generation of surface plasmonic waves resonating at visible light frequencies. In one embodiment, two or more of the interlaced walls have different thicknesses to further enhance the adsorption of sunlight in the visible light spectrum.

In alternative embodiments, metamaterials-enhanced solar receivers of the present invention are constructed either as a single-piece (integral) unit or multiple-part assembly. According to the single-piece approach, the entirety of the solar receiver includes an integral block of high melting point sunlight absorbing base material upon which the metamaterial structure is formed (i.e., with the waffle-like array is formed on an upward-facing surface of the block), and heat-exchange fluid conduits are machined into the block below the upward-facing surface. An advantage of the single-piece approach is that utilizing a single material block precludes the possibility of delamination, which is a problem with coatings-based approaches. According to the multiple-part approach, the solar receiver includes a thin (e.g., wafer- or foil-like) sheet of high melting point sunlight absorbing base material upon which the metamaterial structure is formed, and then the wafer-like sheet is operably secured to a block-type base section. An advantage of the two-piece approach is that forming the waffle-like array on a thin wafer-like structure simplifies the metamaterials engineering process because it facilitates using existing semiconductor processing equipment with minimal modifications. Another advantage of the two-piece approach is that it facilitates the efficient formation of curved (e.g., pipe-like) solar receiver structures by way of forming the metamaterial structure on a flexible foil-like sheet, and then press-forming the foil-like sheet such that it contours to a curved surface formed on the base section.

According to another embodiment of the present invention, a CSP plant includes a solar concentrator configured to concentrate incident solar energy onto a solar receiver for conversion into thermal energy passed to a heat transfer fluid with high efficiency, wherein the solar receiver includes a metamaterials-enhanced surface structure configured in accordance with any of the embodiments described above. In a preferred embodiment, the solar receiver is disposed on a tower, and the solar concentrator includes multiple ground-based heliostats having flat mirrors that respectively reflect sunlight onto the metamaterials-enhanced surface structure. In alternative embodiments, the solar concentrator is implemented by a solar dish or a parabolic trough.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to improved solar receivers for CSP plants. The following description is presented to enable one of ordinary skill in the art to make and use the invention as provided in the context of a particular application and its requirements. As used herein, directional terms such as "upper", "upward-facing", "lower", "horizontal" and "downward" are intended to provide relative positions for purposes of description, and are not intended to designate an absolute frame of reference. In addition, the phrases "integral" and "integrally formed" are used herein to describe the connective relationship between two portions of a single molded or machined structure, and are distinguished from the terms "connected" or "coupled" (without the modifier "integrally"), which indicate two separate structures that are joined by way of, for example, adhesive, fastener, clip, or movable joint. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
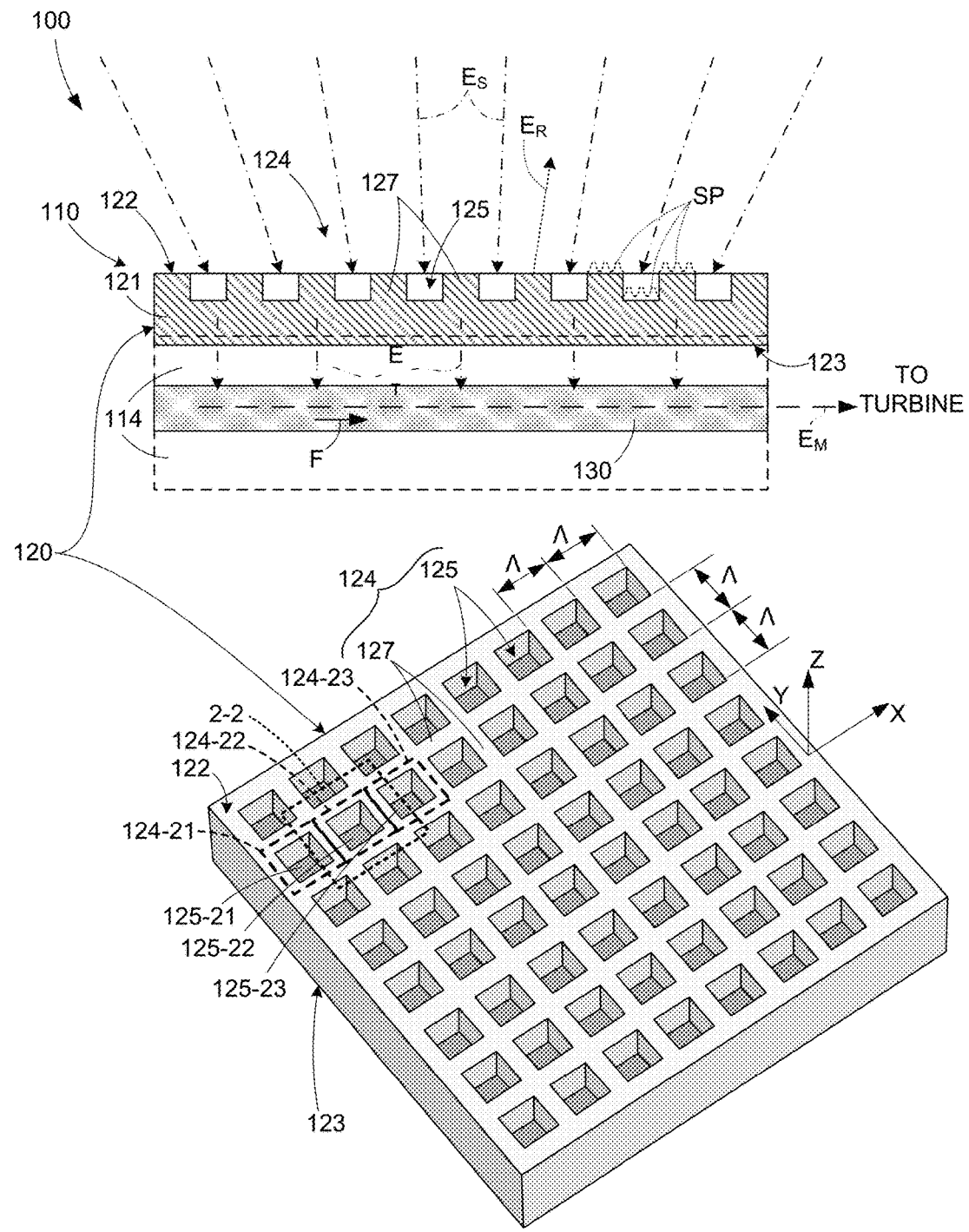
FIG. 1 is a cross-sectional side and partial perspective views showing a simplified solar receiver including a metamaterial structure according to a simplified embodiment of the present invention.

FIG. 1 shows a generalized and greatly simplified concentrating solar power (CSP) plant 100 including a solar receiver 110 produced in accordance with an embodiment of the present invention. CSP plant 100 utilizes a solar concentrator (not shown) to converge sunlight beams such that concentrated solar energy $E_S$ solar energy is directed onto solar receiver 110. Similar to conventional solar receivers, solar receiver 110 is configured to convert incident concentrated solar energy $E_S$ into thermal energy $E_T$ that is then converted into mechanical energy $E_M$ by way of heating a heat-transfer fluid 130 (e.g., water/steam or molten salt) passing through a conduit structure 114 that is part of solar receiver 110. The heat-transfer fluid 130 is then converted (if needed) into high temperature steam that is used to generate electricity by way of driving a steam turbine (not shown).

According to a novel aspect of the invention, at least a portion of solar receiver 110 comprises a metamaterials-enhanced sunlight-receiving surface structure 120, referred to herein as metamaterial structure 120, comprising a base material 121 having a first upward-facing surface 122 that is metamaterials-enhanced (engineered) to include substantially cube-shaped microcavities 125 and associated interlaced walls 127 forming a periodic (waffle-like) array 124 having a grating period Λ in the range of 0.5 to 2 microns. As known to those skilled in the art, the terms "metamaterials" or "metamaterial structure" generally refer to an array of structural elements (sometimes referred to as "meta-atoms") that are arranged in repeating patterns on a base material at scales that are smaller than the wavelengths of the phenomena they are intended to influence. Using this definition, metamaterial structure 120 is implemented by integrally forming waffle-like array 124 on/into upward-facing surface 122 of base material 121, where each microcavity 125 and the associated segments of interlaced walls 127 that surround each microcavity 125 form the meta-atoms (constituent units) of metamaterial structure 120. Note that metamaterials derive their optical properties not from the properties of the base materials, but from the meta-atom structures, whose precise shape, geometry, size, orientation and arrangement gives the base material the ability to manipulate electromagnetic waves to achieve benefits that cannot be achieved by the base material without the metamaterial enhancement. In this case, the present inventors have determined that forming waffle-like array 124 with grating period Λ in the range of 0.5 to 2 microns facilitates adsorption of incident solar radiation $E_S$ in the visible light spectrum with high efficiency (i.e., above 95%), and also facilitates low emission of electromagnetic radiation $E_R$ having wavelengths in the infrared spectrum, thereby minimizing radiative heat loss. As used herein, the phrase "metamaterials-enhanced" denotes a material surface that has been subject to a photo-lithographic fabrication process or other proactive engineering process to include the surface features described herein, as opposed to surface patterns that form naturally.

An exemplary portion of metamaterial structure 120, which is greatly simplified and greatly enlarged form for explanatory purposes, is depicted at the lower portion of FIG. 1. In one embodiment, waffle-like array 124 is formed by way of removing spaced-apart sections from a substantially planar upward-facing (i.e., sunlight receiving, first) surface 122 of a sheet/block of sunlight absorbing material 121, whereby substantially cube-shaped microcavities 125 are defined through (i.e., formed by voids extending into) surface 122. The removed spaced-apart sections are aligned in rows and columns, whereby remaining (i.e., un-etched) sections of material 121 form interlaced walls 127 that separate adjacent microcavities 125, and the remaining portions of upward-facing surface 122 forming upper (horizontal) surfaces of interlaced walls 127. In one embodiment, microcavities 125 are formed in substantially planar upward-facing surface 122 by way of photo-lithographic processing (e.g., forming a mask that covers the interlaced wall sections and exposes the microcavity sections for etching). Interlaced walls 127 extend in parallel horizontal (X- and Y-axis) directions across upward-facing surface 122, and micro-openings 125 extend into (i.e., in the negative Z-axis direction) upward-facing surface 122, but do not pass through to lower surface 123 of surface structure 120.

As mentioned above, each cube-shaped microcavity 125 and its associated surrounding segments of interlaced walls 127 form one meta-atom of metamaterial structure 120. For example, as indicated in the lower portion of FIG. 1, microcavity 125-22 and its associated surrounding wall segments form a meta-atom 124-22, which is disposed between meta-atoms 124-21 and 124-23 respectively including microcavities 125-21 and 125-23 and their respective wall segments. To provide solar receiver 110 with the desired optical characteristics, the dimensions of the microcavity opening and wall segment thickness of each meta-atom are set by grating period $\Lambda$ (i.e., the sum of these dimensions is in the range of 0.5 to 2 microns). As explained in additional detail below, forming waffle-like array 124 with this grating period $\Lambda$ has been found to greatly enhance adsorption of peak sunlight energy (i.e., sunlight having wavelengths in the visible light spectrum), and also has proven to minimize radiative thermal losses by way of suppressing the emission of electromagnetic radiation $E_R$ in the IR spectrum.

According to another aspect of the present invention, base material 121 consists essentially of a high melting point sunlight absorbing material. In addition to providing the desired spectrally selective optical characteristics, solar receiver 110 must be able to withstand the expected elevated temperatures (e.g., 600° C. and higher). Accordingly, in one embodiment, base material 121 is implemented using a high melting point metal (e.g., a refractory metals such as tantalum and molybdenum, which are notable for their high melting points). In a currently preferred refractory metal embodiment, base material 121 is implemented using molybdenum because, unlike some refractory metals that are known to form relatively thick oxide layers when exposed to air, molybdenum forms a relatively thin oxide layer (i.e., having a thickness of a few nanometers) that does not adversely influence the designed optical functionality (i.e., does not skew the metamaterial dimensions), and also serves to prevent further oxidation. In another embodiment, base material 121 is implemented using a non-metal material such as silicon carbide (SiC), which is known to have excellent thermal properties (e.g. low coefficient of thermal expansion, high thermal conductivity) at high temperatures. Unlike metals, SiC is a semiconductor, and therefore a surface structure consisting essentially of SiC may require a slightly different metamaterial geometry (i.e., different feature dimensions, discussed below) to achieve optical properties similar to those of metal-based surface structures. The ability to dope SiC provides a further degree freedom that may be utilized to tune the plasmonic and optical properties of the metamaterial structure.

Figure 2:
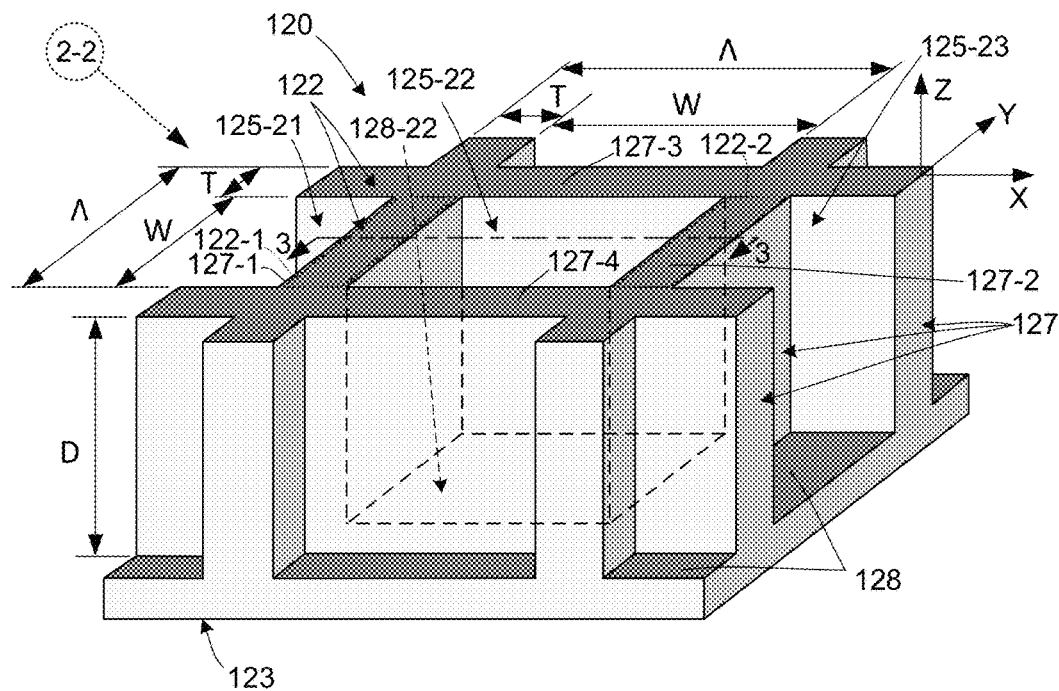
FIG. 2 is a cut-away top side perspective view showing an enlarged microcavity and surrounding interlaced walls that form a meta-atom of the metamaterial structure of FIG. 1.

FIG. 2 is a cut-away perspective view showing meta-atom 124-22 in additional detail. Note that FIG. 2 shows the portion of metamaterial structure 120 indicated by the dashed-line box labeled "2-2" in FIG. 1. Meta-atom 124-22 generally includes wall segments 127-1 and 127-2 that extend in the Y-axis direction, wall segments 127-3 and 127-4 that extend in the X-axis direction, and horizontal bottom wall 128-22, which collectively surround and define the void region referenced as microcavity 125-22.

According to a specific embodiment of the present invention, the dimensions of the various features forming metamaterial structure 120 of solar receiver 110 generally coincide with wavelengths of electromagnetic radiation in the visible light spectrum. As set forth above, the exact dimensions of the metamaterial structural features determines the desired optical characteristics (e.g., absorption and emission spectra). By forming solar receiver 110 with metamaterial structure 120 made up of meta-atoms having feature sizes equal to or slightly outside the range of wavelengths corresponding to visible light (i.e., approximately 0.4 to approximately 1 micron), solar receiver 110 exhibits high absorptance of sunlight in the visible light spectrum, and minimizes the emission of electromagnetic radiation in the IR spectrum, thus minimizing radiative thermal loss. In one embodiment, each interlaced wall 127 has a lateral (horizontal) thickness T in the range of 0.2 to 1 microns, and each microcavity 125 (e.g., microcavity 125-22) has a lateral width W in the range of 0.1 to 1 micron, and a transverse (vertical) depth D in the range of 0.1 to 3 microns. In one embodiment, grating period $\Lambda$ is set at the high end of the peak resonant wavelength of incident solar energy $E_S$ (i.e., approximately 1 micron), and the exact dimensions of the structural features forming each meta-atom, which provide solar receiver 110 with the desired optical characteristics, are then numerically determined through a parametric search using finite difference time domain (FDTD), finite element method (FEM), and rigorous coupled-wave analysis (RCWA) methods. Using these methods, a corresponding reflectance can be simulated for a given metamaterial structure, from which the absorptance and emittance curves can be indirectly calculated.

Figure 3:
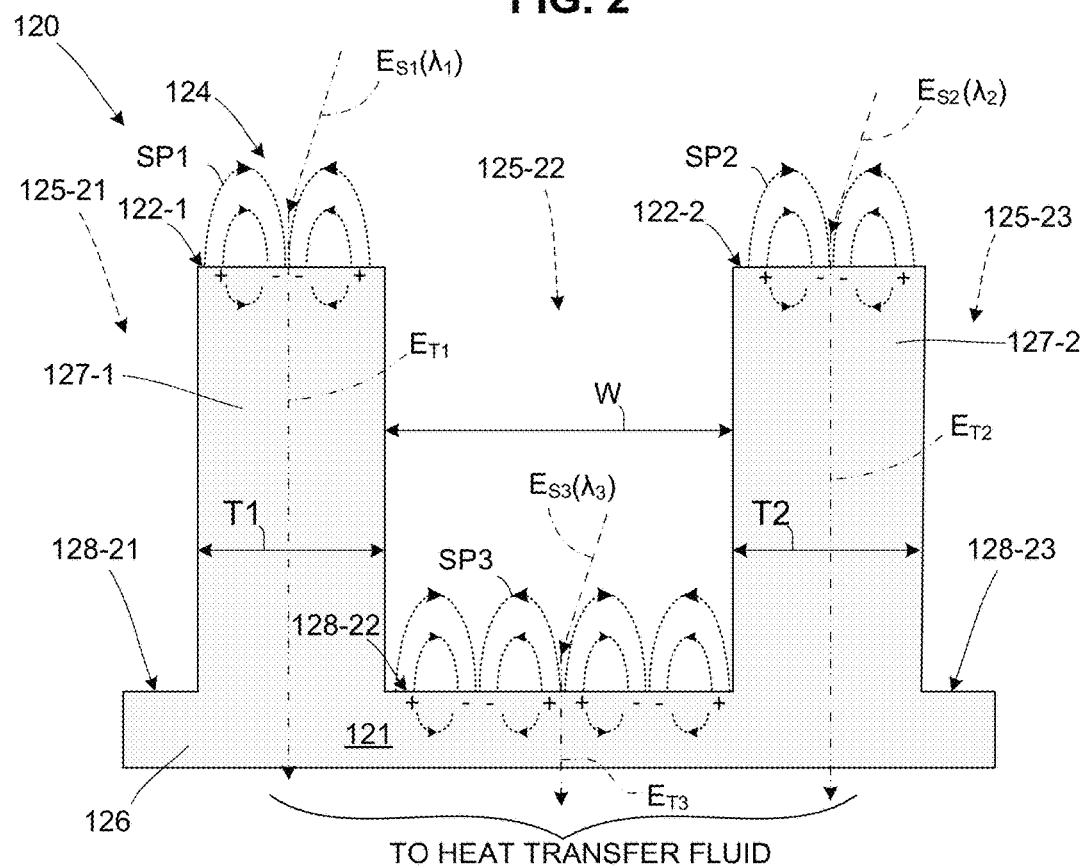
FIG. 3 is cross-sectional side view showing the meta-atom of FIG. 2 in additional detail.

FIG. 3 is a cross-sectional view showing meta-atom 124-22 taken along section line 3-3 of FIG. 2, and depicts sunlight adsorption to illustrate the beneficial optical properties of metamaterial structure 120. Note that, in cross-section, the waffle-like pattern of metamaterial structure 120 forms a square-wave-type surface pattern, with upper wall surface portions 122-1 and 122-2 of wall sections 127-1 and 127-2 forming the upper level "steps" of the square-wave-type surface pattern, and microcavity bottom surfaces 128-21, 128-22 and 128-23 of microcavities 125-1, 125-2 and 125-3, respectively, forming the lower levels of the square-wave-type pattern. As indicated below, the exact dimensions of these surface features (e.g., thicknesses T1 and T2 of wall sections 127-1 and 127-2, respectively, and width W of microcavity 125-22) determine the optical characteristics of metamaterial structure 120.

As depicted in FIG. 3, during operation metamaterial structure 120 is oriented such that incident solar radiation is directed onto waffle-like pattern 124. In the depicted example, incident solar radiation portions $E_{S1}$ and $E_{S2}$ are respectively directed onto surface portions 122-1 and 122-2 of wall segments 127-1 and 127-2, respectively, and solar radiation portion $E_{S3}$ is directed onto bottom surface 128-22 of microcavity 125-22. Under these conditions, highly localized surface waves are induced by incident electromagnetic radiation and generated at interfaces between air and surface portions 122-1, 122-2 and 128-22 material, and the resonant coherent oscillations of these conduction-band electrons at these interfaces are called "surface plasmons". As indicated in FIG. 3, solar radiation portions $E_{S1}$ and $E_{S2}$ couple to surface plasmons SP1 and SP2 at the air/surface interface defined by upper surface portions 122-1 and 122-2 of wall segments 127-1 and 127-2, respectively, and solar radiation portion $E_{S3}$ couple to surface plasmon SP3 at lower surface portions 128-22. While surface plasmons SP1 to SPR3 do not respectively couple to incident radiation portions $E_{S1}$ to $E_{S3}$, coupling is achieved via interlace wall segments 127-1 and 127-2 and bottom wall 128-22 that define (surround) microcavity 125-22.

Figure 4:
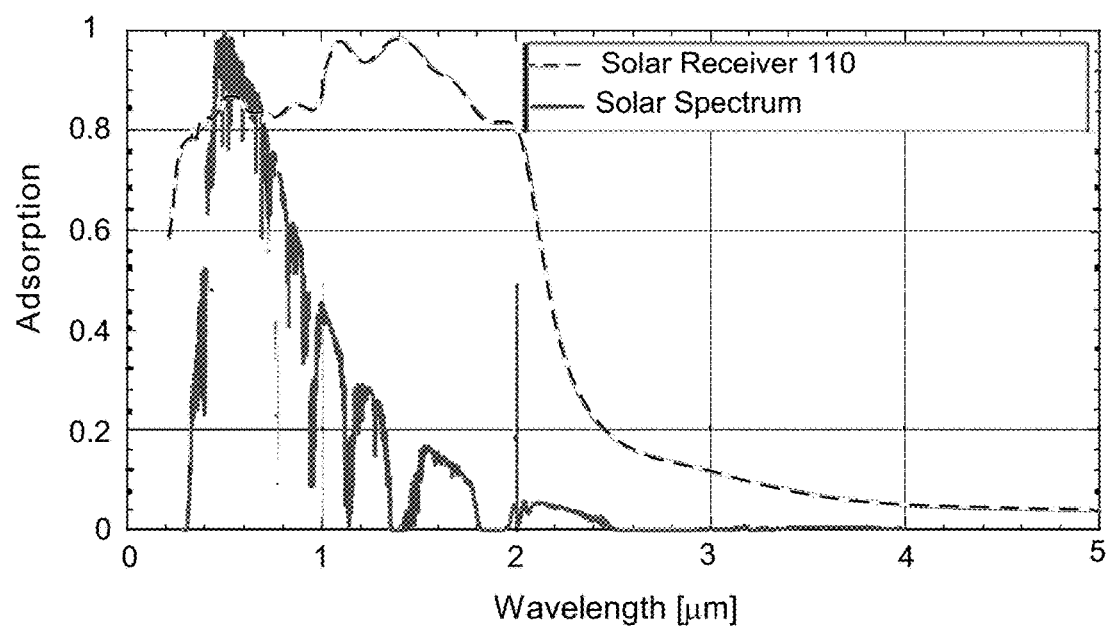
FIG. 4 is a graph showing a modeled absorption spectrum for an exemplary metamaterial structure.

As mentioned above, the exact feature size (dimensions) of the interlaced wall architecture and microcavity openings determine the resonant frequencies of the surface plasmonic waves generated by metamaterial structure 120. That is, unlike conventional materials, for which the permittivity and permeability are derived from the constituent atoms, the effective complex permittivity and permeability of a metamaterial is derived from each constituent unit, such as meta-atom 124-22. In other words, only incident electromagnetic radiation having intrinsic frequencies equal to these resonant frequencies of the surface plasmons will couple strongly to surface plasmonic waves SP1 to SP3. At resonance, a strong enhancement of the localized electromagnetic field is established, and electromagnetic energy is efficiently confined in metamaterial structure 120. In this case, the horizontal (lateral) thickness T1 of wall segment 127-1 determines the frequency of surface plasmon resonance SP1, which in turn determines the resonant frequency of solar radiation portion $E_{S1}$ to which surface plasmon resonance SP1 couples, whereby solar radiation portion $E_{S1}$ is converted to thermal energy (heat) $E_{T1}$ that is transmitted down wall segment 127-1. Similarly, the thickness T2 of wall segment 127-2 determines the resonant frequency of surface plasmon SP2, which in turn determines the frequency of solar radiation portion $E_{S2}$ to which surface plasmon SP2 couples, whereby solar radiation portion $E_{S2}$ is converted to thermal energy (heat) $E_{T2}$. Moreover, the width W of microcavity 125-22 determines the resonant frequency of surface plasmon SP3, which in turn determines the frequency of solar radiation portion $E_{S3}$ to which surface plasmon resonance SP3 couples, whereby solar radiation portion $E_{S3}$ is converted to thermal energy (heat) $E_{T3}$. In this way, microcavity 125-22 acts as a sink for incident solar radiation ES1 to ES3, with the surface waves dissipating in the form of thermal energy $E_{T1}$ to $E_{T3}$. Referring to FIG. 2, this conversion also occurs in wall segments 127-3 and 127-4 of meta-atom 124-22. Engineering metamaterial structure 120 to have resonances primarily (if not exclusively) in the visible regime (i.e., not in the IR regime) of the spectrum will result in an absorption spectrum close to the ideal absorber target. FIG. 4 is a graph showing an example of a modeled absorption spectrum for a metamaterial structure fabricated in the above-described waffle-like array with specification including a grating period Λ of 1 µm, a microcavity width W of 800 nm, and microcavity depth D of 1.6 µm, and using tantalum as the surface material. The terrestrial solar spectrum is also shown in FIG. 4 for comparison.

In addition to exhibiting high absorptance efficiency, metamaterial structures formed in accordance with the above description minimizes radiative thermal losses by way of exhibiting spectral selectivity to visible light. Spectrally selective surfaces are generally characterized by exhibiting high absorptance at wavelengths below some cut-off wavelength and low absorptance above that cut-off wavelength. The absorptance of a surface material indicates the effectiveness in absorbing radiant energy, and is indicated as the fraction of incident electromagnetic power that is absorbed at an interface. The cut-off wavelength is dependent on the operating temperature and expected concentrating ratio at the receiving surface. For example, a concentrating solar photovoltaics parabolic trough receiver operating at 500° C. would have a cut-off wavelength of approximately 2.5 µm. At higher temperatures, the peak wavelength of the blackbody thermal radiation shifts to shorter wavelengths, therefore the cut-off wavelength similarly will need to be reduced. For the known solar spectrum at the earth's surface, assuming black-body radiation for temperatures above about 600° C., the absorptance for an idealized selective surface would have a cut-off wavelength of 2.5 µm.

Referring again to FIGS. 2 and 3, in alternative embodiments, interlaced walls 127 either have the same thickness T (as indicated in FIG. 2), thus generating resonances at the same frequency, or are formed with different thicknesses (e.g., thicknesses T1 and T2 in FIG. 3, where T2>T1), thus causing the different walls to absorb solar energy at slightly different frequencies.

According to additional alternative embodiments, solar receivers produced in accordance with the present invention either comprise integral structures or multiple-part structures.

Figure 5:
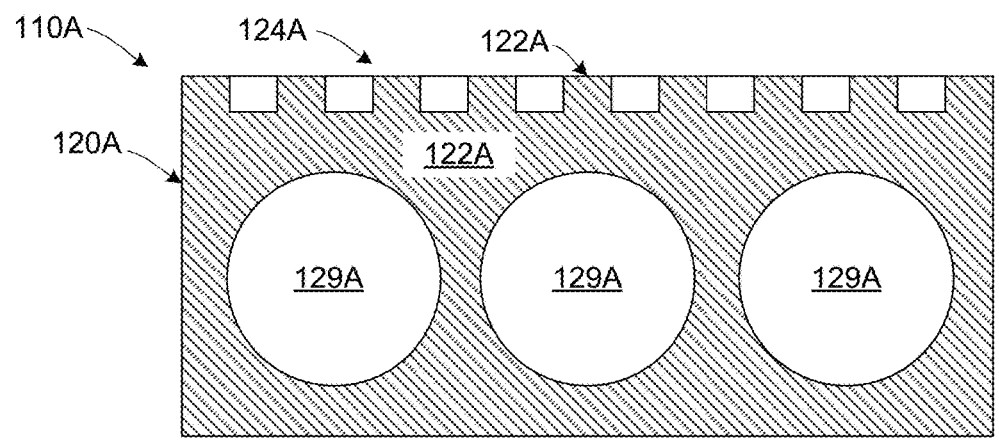
FIG. 5 is a simplified cross-sectional side view showing a one-piece solar receiver according to a first exemplary embodiment of the present invention.

FIG. 5 shows a first exemplary embodiment in which metamaterial structure 120A forms an entirety of solar receiver 110A, and comprises an integrally-formed block 121A of high melting point sunlight absorbing base material (e.g., a refractory metal). In this example, heat-exchange fluid conduits 129A are bored or otherwise cut through block 121A either before or after waffle-like array 124B is formed on upward-facing surface 122A. An advantage of the single-piece approach is that this precludes the possibility of delamination.

Figure 6A:
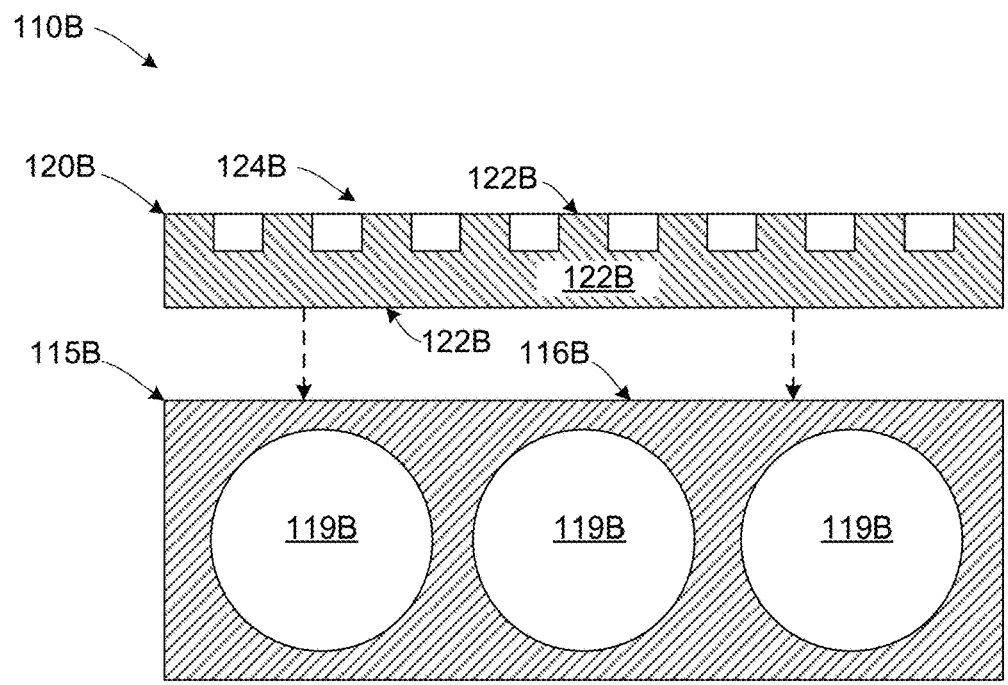
FIGS. 6(A) and 6(B) are exploded and assembled cross-sectional side views showing showing a two-piece solar receiver according to a second exemplary embodiment of the present invention.
Figure 6B:
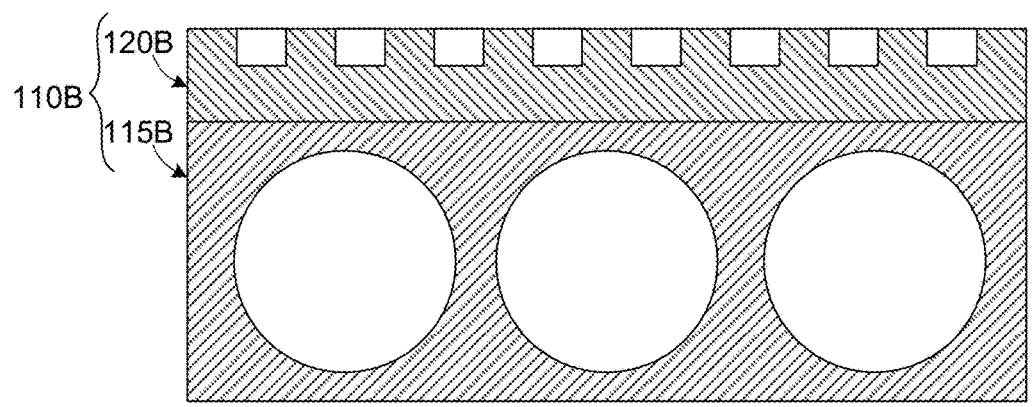

FIGS. 6(A) and 6(B) show a second exemplary embodiment in which solar receiver 110B includes a film-like structure 120B that is disposed on a block-like base section 115B. In this case, metamaterial structure 120B comprises a thin (foil or wafer) substrate 121B consisting essentially of a high melting point sunlight absorbing base material having upward-facing surface 122B upon which is formed a waffle-like array 124B having the features described above. In this case, a lower surface 123B of substrate 121B is secured to an upper surface 116B of base section 115B, which has been separately processed (e.g., machined) to include heat-exchange fluid conduits 119B. An advantage of the two-piece approach is that this approach simplifies processing of metamaterial structure 120B, and facilitates forming curved (e.g., pipe-like) solar receiver structures by way of bending surface structure 120B onto a curved surface of base section 115B.

Figure 7:
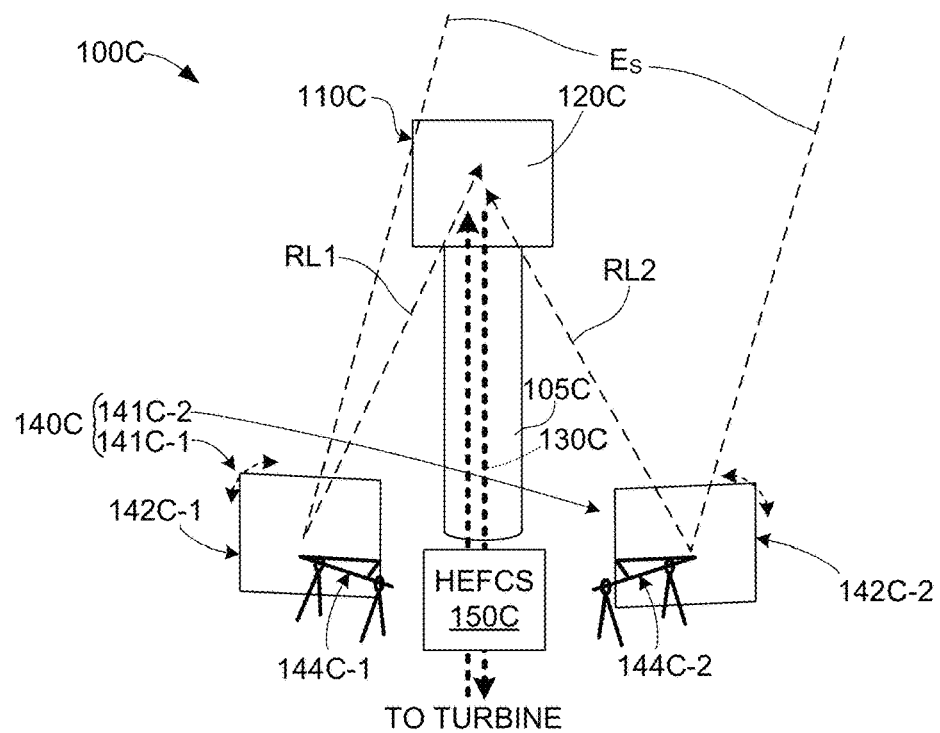
FIG. 7 is a perspective side view showing a simplified central receiver CSP plant including a solar receiver according to another embodiment of the present invention.
Figure 8:
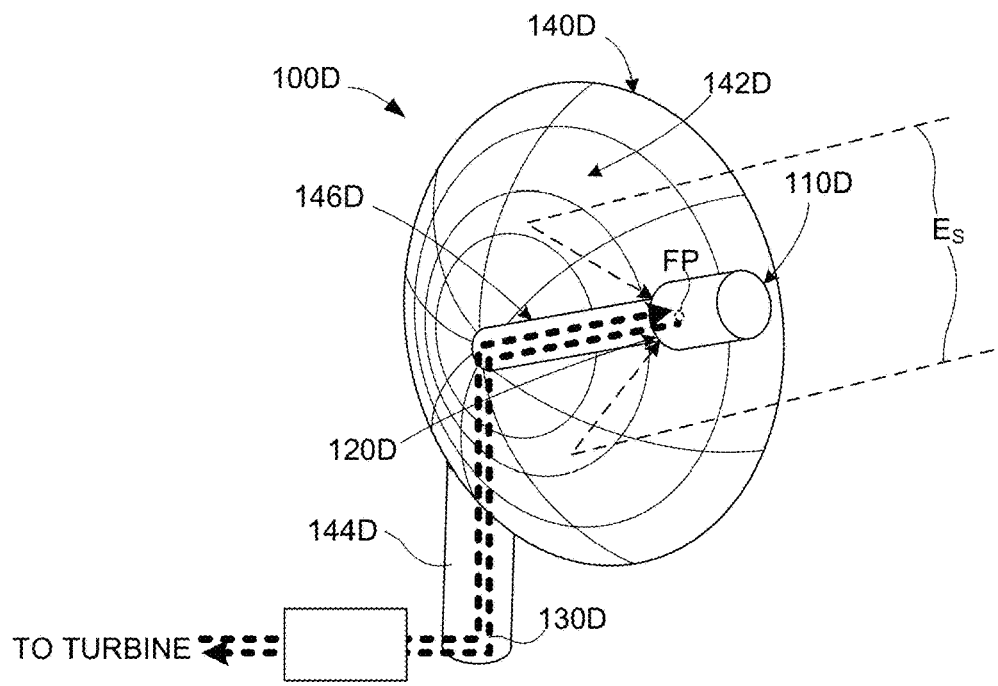
FIG. 8 is a perspective side view showing a simplified solar dish CSP plant including a solar receiver according to another embodiment of the present invention.
Figure 9:
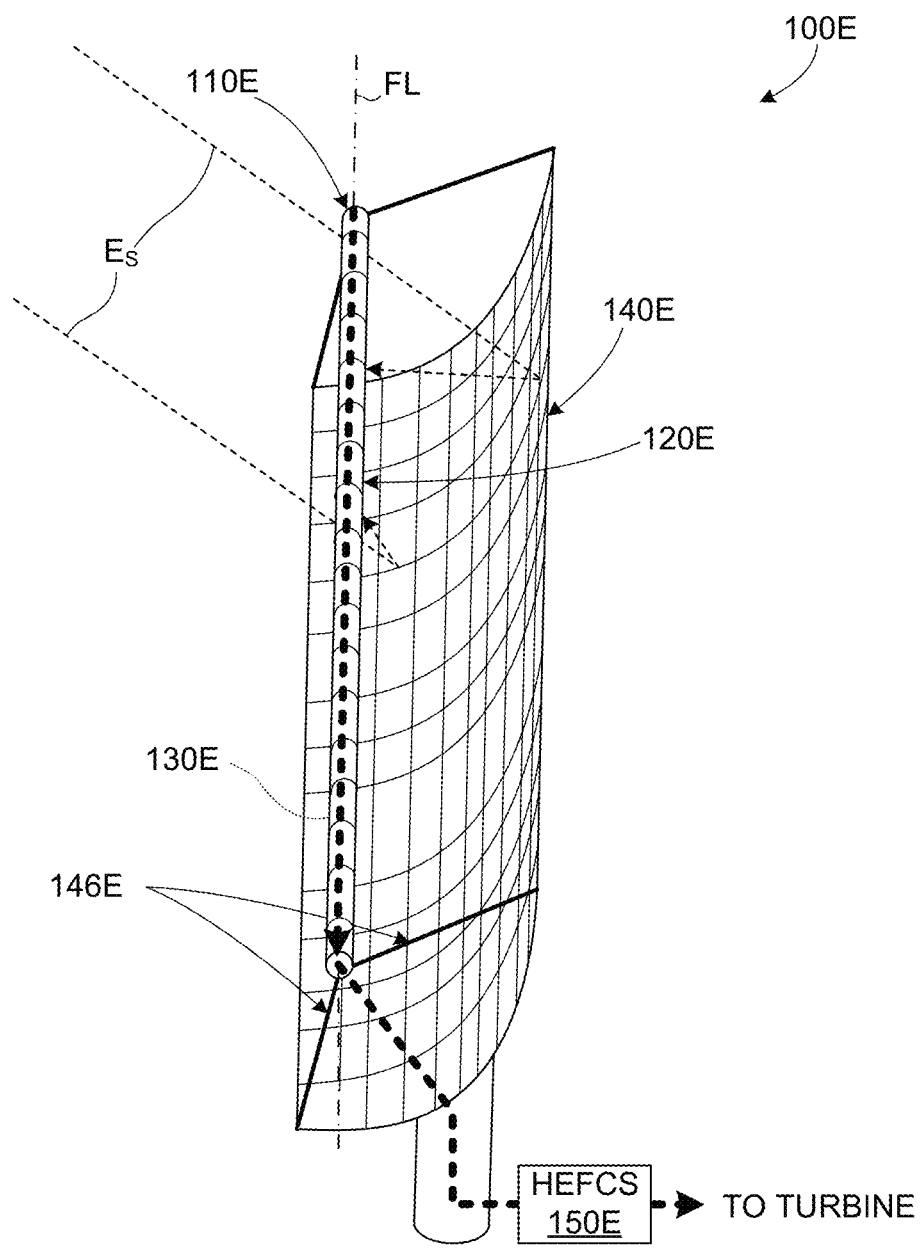
FIG. 9 is a perspective side view showing a simplified solar trough CSP plant including a solar receiver according to another embodiment of the present invention.

The various solar receivers described above may be utilized to provide various different CSP plants. For example, FIG. 7 shows a central receiver CSP plant 100C including a tower 105C supporting a solar receiver 110C, heliostats 141C-1 and 141C-2 form a concentrator 140C configured to concentrate incident solar energy $E_S$ onto solar receiver 110C, where solar solar receiver 110C includes a metamaterials-enhanced surface structure 120C according to any of the embodiments mentioned above, and is further configured to transfer heat energy to a heat-exchange fluid 130C that is transmitted by way of a heat-exchange fluid circulation system 150C to a turbine (not shown). Alternatively, FIG. 8 shows a solar dish CSP plant 100D including a solar dish concentrator 140D disposed on a support 144D and configured to focus solar energy $E_S$ onto a solar receiver 110D maintained by way of a central post 146D at a focal point FP, where solar receiver 110D includes a metamaterials-enhanced surface structure 120D according to any of the embodiments mentioned above, and is further configured to transfer heat energy to a heat-exchange fluid 130D. FIG.

9 shows a parabolic trough CSP plant 100E according to another embodiment including a trough-type concentrator 140E configured to focus solar energy $E_S$ onto a pipe-like solar receiver 110E maintained by way of a support arms 146E along a focal line FL, where solar receiver 110E includes a metamaterials-enhanced surface structure 120E according to any of the embodiments mentioned above, and is further configured to transfer heat energy to a heat-exchange fluid 130E.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A solar receiver comprising a metamaterials-enhanced sunlight-receiving structure consisting essentially of a high melting point base material having a first surface comprising a plurality of substantially cube-shaped microcavities surrounded by associated interlaced walls that are disposed a periodic array having a grating period in the range of 0.5 to 2 microns, wherein a first wall of said associated interlaced walls has a first lateral thickness and a second wall of said associated interlaced walls has a second lateral thickness, said second lateral thickness being greater than said first lateral thickness.

2. The solar receiver of claim 1, wherein said high melting point base material comprises one of a refractory metal and silicon carbide.

3. The solar receiver of claim 1, wherein each wall of said associated interlaced walls has a thickness in the range of 0.2 to 1.0 microns.

4. The solar receiver of claim 3, wherein each microcavity of the plurality of microcavities has a width in the range of 0.1 to 1 micron, and a depth in the range of 0.1 to 3 microns.

5. The solar receiver of claim 3, wherein said first lateral thickness is set such that said first wall of said associated interlaced walls absorbs solar energy having a first frequency, and said second lateral thickness is set such that said second wall of said associated interlaced walls absorbs solar energy having a second frequency, said second frequency being greater than said first frequency.

6. The solar receiver of claim 1, wherein an entirety of said solar receiver comprises an integral structure consisting essentially of said high melting point base material.

7. The solar receiver of claim 1,
wherein said solar receiver further comprises a base section defining a plurality of conduits, and
wherein said metamaterials-enhanced sunlight-receiving structure is fixedly attached to said base section.

8. A solar receiver including a metamaterial structure comprising a high melting point base material having a first surface, wherein the first surface defines a plurality of substantially cube-shaped microcavities disposed in a periodic array between parallel interlaced walls,
wherein each wall of said interlaced walls has a lateral thickness in the range of 0.1 to 1 micron, and
wherein a first wall of said associated interlaced walls has a first lateral thickness and a second wall of said associated interlaced walls has a second lateral thickness, said second lateral thickness being greater than said first lateral thickness.

9. The solar receiver of claim 8, wherein said high melting point material comprises one of a refractory metal and silicon carbide.

10. The solar receiver of claim 8, wherein each microcavity of the plurality of microcavities has a width in the range of 0.1 to 1 micron, and a depth in the range of 0.1 to 3 microns.

11. The solar receiver of claim 8, wherein said first lateral thickness is set such that said first wall of said associated interlaced walls absorbs solar energy having a first frequency, and said second lateral thickness is set such that said second wall of said associated interlaced walls absorbs solar energy having a second frequency, said second frequency being greater than said first frequency.

12. The solar receiver of claim 8, wherein an entirety of said solar receiver comprises an integral structure consisting essentially of said high melting point base material.

13. The solar receiver of claim 8,
wherein said solar receiver further comprises a base section defining a plurality of conduits, and
wherein said metamaterials-enhanced sunlight-receiving structure is fixedly attached to said base section.

14. A concentrating solar power (CSP) plant comprising:
a solar receiver configured to transfer heat energy to a heat-exchange fluid; and
a solar concentrator configured to concentrate incident solar energy onto said solar receiver,
wherein the solar receiver comprises a metamaterials-enhanced sunlight-receiving structure consisting essentially of a high melting point base material having a first surface comprising a plurality of substantially cube-shaped microcavities surrounded by associated interlaced walls that are disposed a periodic array having a grating period in the range of 0.5 to 2 microns, and wherein a first wall of said associated interlaced walls has a first lateral thickness and a second wall of said associated interlaced walls has a second lateral thickness, said second lateral thickness being greater than said first lateral thickness.

15. The CSP plant according to claim 14, wherein said solar concentrator comprises one of a solar dish and a parabolic trough.

16. The CSP plant according to claim 14 further comprising a central tower supporting said solar receiver, wherein said solar concentrator comprises a plurality of heliostats.

17. The CSP plant according to claim 16, wherein said high melting point material of said metamaterials-enhanced sunlight-receiving structure comprises one of a refractory metal and silicon carbide.

18. The CSP plant according to claim 16, wherein each wall of said associated interlaced walls has a thickness in the range of 0.2 to 1.0 microns.

19. The CSP plant according to claim 16, wherein each microcavity of the plurality of microcavities has a width in the range of 0.1 to 1 micron, and a depth in the range of 0.1 to 3microns.

20. The CSP plant according to claim 16, wherein said first lateral thickness is set such that said first wall of said associated interlaced walls absorbs solar energy having a first frequency, and said second lateral thickness is set such that said second wall of said associated interlaced walls absorbs solar energy having a second frequency, said second frequency being greater than said first frequency.

* * * * *